(12) United States Patent
Fujii et al.

(10) Patent No.: US 7,666,325 B2
(45) Date of Patent: Feb. 23, 2010

(54) LIQUID CRYSTAL ORIENTATION LAYER AND LIQUID CRYSTAL DISPLAY ELEMENT

(75) Inventors: Osamu Fujii, Kanagawa (JP); Yoshiki Nakamura, Kanagawa (JP)

(73) Assignee: Sony Corporation, Tokyo (JP)

( * ) Notice: Subject to any disclaimer, the term of this patent is extended or adjusted under 35 U.S.C. 154(b) by 483 days.

(21) Appl. No.: 11/534,479

(22) Filed: Sep. 22, 2006

(65) Prior Publication Data

US 2007/0071913 A1    Mar. 29, 2007

(30) Foreign Application Priority Data

Sep. 29, 2005  (JP)  ............................. P2005-284571
Mar. 22, 2006  (JP)  ............................. P2006-079346

(51) Int. Cl.
*C09K 19/00*  (2006.01)
*C09K 19/06*  (2006.01)
*C09K 19/52*  (2006.01)

(52) U.S. Cl. ............................. 252/299.01; 252/299.6; 428/1.1; 428/1.2; 430/20; 349/106

(58) Field of Classification Search .................. 428/1.1, 428/1.2; 252/299.01, 299.6; 430/20; 349/106
See application file for complete search history.

(56) References Cited

U.S. PATENT DOCUMENTS

2007/0154658 A1 *   7/2007   Kang et al. ................. 428/1.25

FOREIGN PATENT DOCUMENTS

| JP | 2000-250047 | 9/2000 |
| JP | 2001-004526 | 1/2001 |
| JP | 3206401 | 7/2001 |
| JP | 2004-170718 | 6/2004 |

* cited by examiner

*Primary Examiner*—Geraldina Visconti

(74) *Attorney, Agent, or Firm*—Sonnenschein Nath & Rosenthal LLP

(57) ABSTRACT

A liquid crystal orientation layer contains at least one polymer selected from polyamic acids and polyimides and at least one epoxy compound having a chemical structure represented by the following formula (1) or (2), the X moieties in the formulae containing an alicyclic epoxy group or a glycidyl group represented by the following formula (a) or (b):

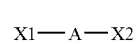

(1)

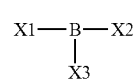

(2)

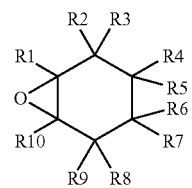

(a)

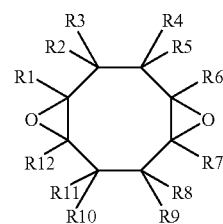

(b)

with the substituents as defined herein the specification.

18 Claims, 2 Drawing Sheets

LIQUID CRYSTAL ORIENTATION LAYER AND LIQUID CRYSTAL DISPLAY ELEMENT

CROSS REFERENCES TO RELATED APPLICATIONS

The present invention contains subjects related to Japanese Patent Application JP 2005-284571 filed in the Japan Patent Office on Sep. 29, 2005 and Japanese Patent Application JP 2006-079346 filed in the Japan Patent Office on Mar. 22, 2006, the entire contents of which being incorporated herein by reference.

BACKGROUND OF THE INVENTION

1. Field of the Invention

The invention relates to a liquid crystal orientation layer and to a liquid crystal display element. In particular, the invention relates to a liquid crystal orientation layer and to a liquid crystal display element, each of which is used in a liquid crystal projector.

2. Description of the Related Art

In a liquid crystal display element, a TFT array substrate on a surface of which is formed an orientation layer for the purpose of orienting a liquid crystal and a counter substrate on which a similar orientation layer is formed are arranged opposite to each other, and a liquid crystal is filled between the two sheets of substrates.

As a method for imparting an orienting function to the foregoing liquid crystal orientation layer, a rubbing method of rubbing the liquid crystal orientation layer by a cloth and stretching the layer is chiefly employed. As an organic high molecular weight compound (polymer) for configuring a liquid crystal orientation layer, polyimides, polyamic acids, and so on are known. With respect to the molecular structure of polyimides or polyamic acids, from the viewpoint of reactivity (basicity) of the diamine, the major part of usual compounds generally has an aniline structure in which an aromatic ring (for example, a phenyl group) is bound to the diamine.

This phenyl group has an absorption band in an ultraviolet region at a wavelength of about 250 nm. For that reason, when a liquid crystal display element is irradiated with light over a long period of time, the polymer in the orientation layer is decomposed, thereby causing non-uniform display unevenness. This phenomenon becomes remarkable in the case of a liquid crystal projector using a light source capable of emitting light rays with high intensity or a liquid crystal display device using a high-luminance lamp. Among members configuring the liquid crystal display element, the orientation layer is mostly fast deteriorated. In order to improve the life of the liquid crystal display element, it is the most effective to improve the light fastness of the orientation layer.

Taking into consideration the foregoing circumstances, there are proposed liquid crystal orientation layers containing a polyamic acid or a polyimide with a reduced concentration of a phenyl group (see Patent Documents 1 and 2). However, since all of these proposed liquid crystal orientation layers are concerned with polymerization using a linear or alicyclic aliphatic diamine, the synthesis of a polymer having an average molecular weight of 100,000 or more as utilities for liquid crystal orientation is not simple, but a polymer having a relatively low molecular weight is obtained. Furthermore, since this polymer is a polymer having a large quantity of bindings leading to a low Tg from the structural standpoint, when formed into a film, the film becomes a liquid crystal orientation layer with low layer strength. When the layer strength of the liquid crystal orientation layer is low, scars or the like are generated due to rubbing at the time of rubbing treatment to cause display failure.

For the purpose of improving the adhesion and layer strength of the orientation layer, there is proposed a liquid crystal orienting agent resulting from mixing an epoxy compound represented by a prescribed chemical formula with a polymer selected among polyamic acids and polyimides (see Patent Document 3). As the epoxy compound described in Patent Document 3, there are proposed epoxy compounds including tertiary amine-containing epoxy compounds and aromatic ring-containing epoxy compounds. However, such an epoxy compound causes a lowering of the light fastness.

Patent Document 1: JP-A-2000-250047
Patent Document 2: JP-A-2004-170718
Patent Document 3: Japanese Patent No. 3206401

SUMMARY OF THE INVENTION

In the light of the above, it is demanded to improve the layer strength of a liquid crystal orientation layer employing a polymer with a reduced concentration of a phenyl group without lowering the light fastness of the liquid crystal orientation layer.

Under the foregoing circumstances, the invention has been made. It is desired to provide a liquid crystal orientation layer with improved light fastness and layer strength and a liquid crystal display element using the subject liquid crystal orientation layer.

According to an embodiment of the invention, there is provided a liquid crystal orientation layer containing at least one polymer selected from polyamic acids and polyimides and at least one epoxy compound having a chemical structure represented by the following formula (1) or (2), the X moieties in the formulae containing an alicyclic epoxy group or a glycidyl group represented by the following formula (a) or (b).

$$X1\text{-}A\text{-}X2 \tag{1}$$

(2)

In the foregoing formula, any one of X1 to X3 represents an alicyclic epoxy group or a glycidyl group represented by the formula (a) or (b); A represents a divalent aliphatic group; and B represents a trivalent aliphatic group.

(a)

In the foregoing formula, R1 to R10, which may be the same or different, are each used for binding to A or B and besides, each represents a hydrogen atom, a halogen atom, a hydrocarbon group having from 1 to 5 carbon atoms, which may contain an oxygen atom or a halogen atom, or an option ally substituted alkoxy group having from 1 to 5 carbon atoms.

(b)

In the foregoing formula, R1 to R12, which may be the same or different, are each used for binding to A or B and besides, each represents a hydrogen atom, a halogen atom, a hydrocarbon group having from 1 to 5 carbon atoms, which may contain an oxygen atom or a halogen atom, or an optionally substituted alkoxy group having from 1 to 5 carbon atoms.

According to an embodiment of the invention, there is provided a liquid crystal orientation layer containing at least one polymer selected from polyamic acids and polyimides and an epoxy compound represented by the following formula (3) or (4) or a polymer thereof.

(3)

In the foregoing formula, R1 to R12, which may be the same or different, each represents a hydrogen atom, a halogen atom, a hydrocarbon group having from 1 to 5 carbon atoms, which may contain an oxygen atom or a halogen atom, or an optionally substituted alkoxy group having from 1 to 5 carbon atoms.

(4)

In the foregoing formula, R1 to R10, which may be the same or different, each represents a hydrogen atom, a halogen atom, a hydrocarbon group having from 1 to 5 carbon atoms, which may contain an oxygen atom or a halogen atom, or an optionally substituted alkoxy group having from 1 to 5 carbon atoms.

It is preferable that a proportion of the foregoing epoxy compound to the foregoing polymer is 10% by weight or more and not more than 20% by weight.

It is preferable that the foregoing polymer is a wholly aliphatic polymer.

For example, the foregoing polymer is made of a compound represented by the following formula (A).

(A)

According to an embodiment of the invention, there is provided a liquid crystal orientation layer containing at least one polymer selected from polyamic acids and polyimides and at least one epoxy compound represented by the following formula (I).

(I)

In the foregoing formula, Z represents a cyclic aliphatic group; and R13 to R16 each represents an epoxy-containing alkyl group.

It is preferable that the foregoing epoxy compound has a chemical structure represented by any one of the following formulae (II) to (IV).

(II)

(III)

(IV)

It is preferable that a proportion of the foregoing epoxy compound to the foregoing polymer is 10% by weight or more and not more than 40% by weight.

It is preferable that the foregoing polymer is a wholly aliphatic polymer.

For example, the foregoing polymer is made of a compound represented by the foregoing formula (A).

According to an embodiment of the invention, there is provided a liquid crystal display element having a liquid crystal filled between two substrates arranged opposite to each other and having a liquid crystal orientation layer between the substrate and the liquid crystal, wherein the liquid crystal orientation layer formed on either one of the substrates contains at least one polymer selected from polyamic acids and polyimides and at least one epoxy compound having a chemical structure represented by the foregoing formula (1) or (2), the X moieties in the formulae containing an alicyclic epoxy group or a glycidyl group represented by the foregoing formula (a) or (b).

According to an embodiment of the invention, there is provided a liquid crystal display element having a liquid crystal filled between two substrates arranged opposite to each other and having a liquid crystal orientation layer between the substrate and the liquid crystal, wherein the liquid crystal orientation layer formed on either one of the substrates contains at least one polymer selected from polyamic acids and polyimides and an epoxy compound represented by the foregoing formula (3) or (4) or a polymer thereof.

According to an embodiment of the invention, there is provided a liquid crystal display element having a liquid crystal filled between two substrates arranged opposite to each other and having a liquid crystal orientation layer between the substrate and the liquid crystal, wherein the liquid crystal orientation layer formed on either one of the substrates contains at least one polymer selected from polyamic acids and polyimides and at least one epoxy compound represented by the foregoing formula (I).

It is preferable that the foregoing epoxy compound has a chemical structure represented by any one of the foregoing formulae (II) to (IV).

It is preferable that a reflection layer is formed on either one of the two substrates.

According to the embodiments of the invention, by adding the foregoing epoxy compound to the polymer, the epoxy compound acts as a crosslinking agent so that the layer strength of the liquid crystal orientation layer is improved. Furthermore, since the epoxy compound does not contain an aromatic ring, the liquid crystal orientation layer is free from a lowering of the light fastness as caused due to the epoxy compound.

According to the embodiments of the invention, it is possible to realize a liquid crystal orientation layer with improved light fastness and layer strength. As a result, by using the subject liquid crystal orientation layer, it is possible to realize a liquid crystal display element capable of designing to prolong the life.

DETAILED DESCRIPTION OF THE PREFERRED
EMBODIMENTS

Embodiments of the invention will be hereunder described with reference to the accompanying drawings.

First Embodiment

Figure 1:
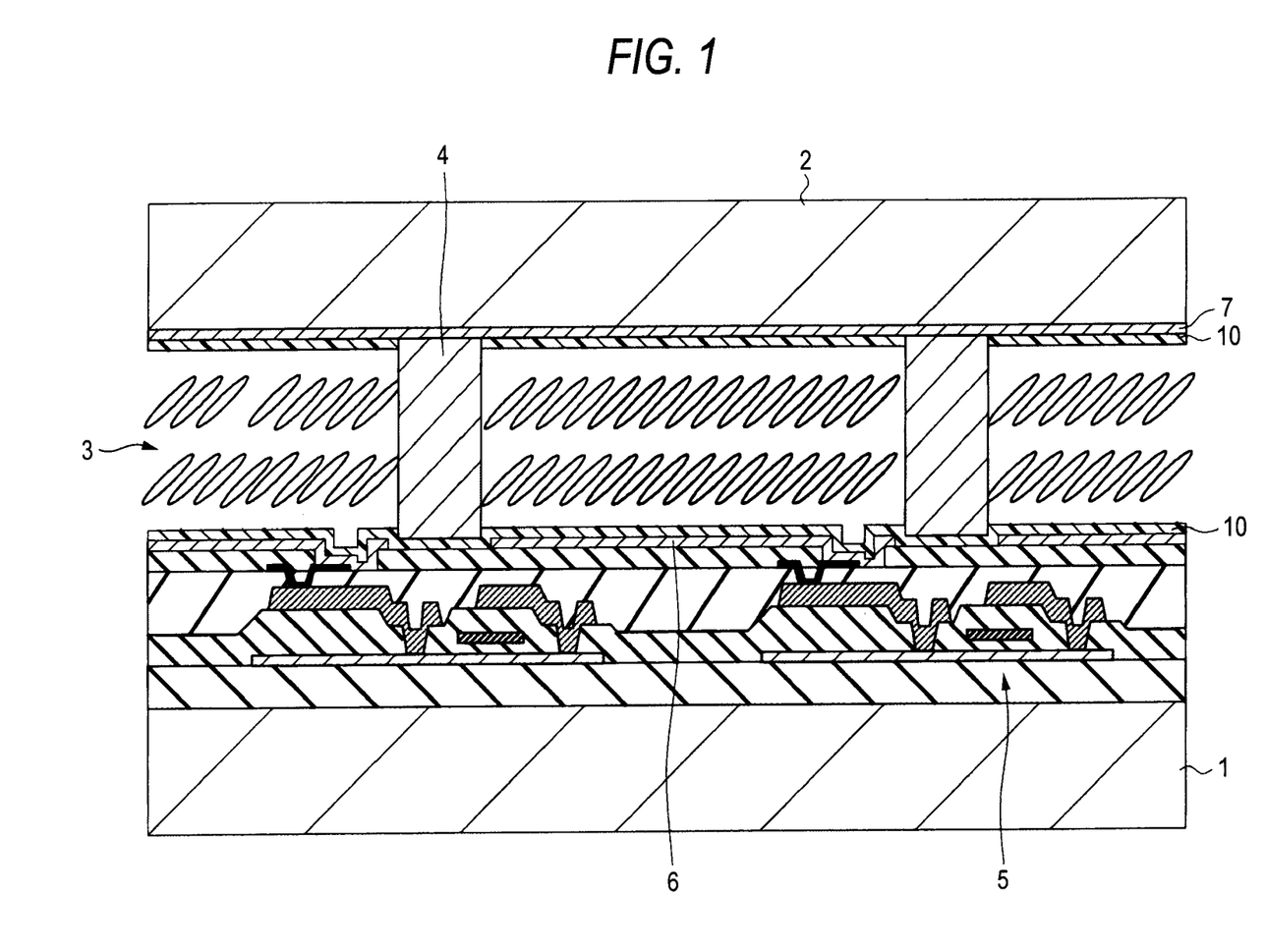
FIG. 1 is a cross-sectional view to show an outline of a liquid crystal display element according to an embodiment of the invention.

FIG. 1 is a schematic cross-sectional view of an active matrix type liquid crystal display element according to the present embodiment.

A liquid crystal display element has a TFT array substrate 1, a transparent counter substrate 2 arranged opposite to the TFT array substrate 1, and a liquid crystal 3 filled between the TFT array substrate and the counter substrate 2. A spacer 4 is mediated between the TFT array substrate 1 and the counter substrate 2. The TFT array substrate 1 and the counter substrate 2 are stuck to each other by a non-illustrated sealing material.

For example, in the case of a transmission type, the TFT array substrate 1 is made of a quartz substrate; and in the case of a reflection type, the TFT array substrate 1 is made of a silicon substrate. On the TFT array substrate 1, a thin film transistor (TFT) 5 is formed for every pixel, and a pixel electrode 6 connecting to a drain of the respective thin film transistor 5 is formed. In the case of a transmission type, the pixel electrode 6 is made of a transparent conductive thin film, for example, an ITO film (indium tin oxide film). In the case of a reflection type, the pixel electrode 6 is a reflection electrode made of, for example, Ag.

The counter substrate 2 is made of, for example, a glass substrate or a quartz substrate. A transparent common electrode 7 made of, for example, an ITO film is formed on an entire surface of the counter substrate 2.

A liquid crystal orientation layer 10 is formed on a front surface of the TFT array substrate 1 while covering the pixel electrode 6 and on a front surface of the counter substrate 2 while covering the common electrode 7, respectively. The liquid crystal orientation layer 10 of the TFT array substrate 1 and the liquid crystal orientation layer 10 of the counter substrate 2 are arranged opposite to each other, and the liquid crystal 3 is filled in a space therebetween. The liquid crystal orientation layer 10 is subjected to a rubbing treatment and controls an orientation direction of the liquid crystal 3. Incidentally, materials of the liquid crystal orientation layer 10 will be described later. The liquid crystal orientation layer 10 is, for example, formed by a spin coating method.

The spacer 4 is a member which is provided for the purpose of controlling the space between the TFT array substrate 1 and the counter substrate 2 and is, for example, formed on an upper layer of the common electrode 7 in a side of the counter substrate 2, and the liquid crystal orientation layer 10 is formed in this upper layer. The spacer 4 is made of a photosensitive resin, for example, a resist.

The liquid crystal 3 is, for example, a twisted nematic (TN type) liquid crystal having a molecular alignment twisted at 90°. The liquid crystal 3 is oriented in a prescribed direction by the liquid crystal orientation layer 10. In the liquid crystal 3, its orientation state varies to cause changes in optical characteristics on a basis of a voltage which is applied between the pixel electrode 6 of the TFT array substrate 1 and the common electrode 7 of the counter substrate 2, thereby controlling the image display.

Figure 2A:
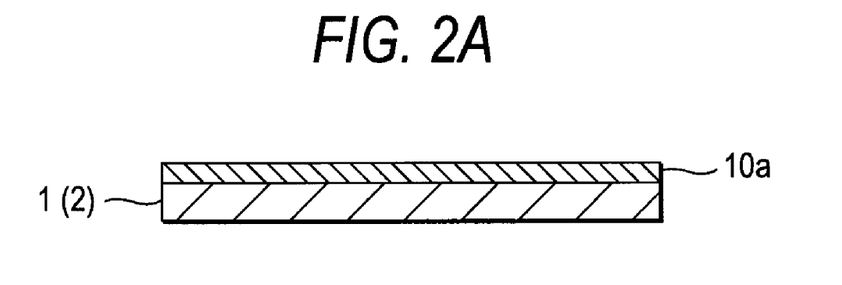
FIGS. 2A to 2C are each a process cross-sectional view to show a forming method of a liquid crystal orientation layer.
Figure 2B:
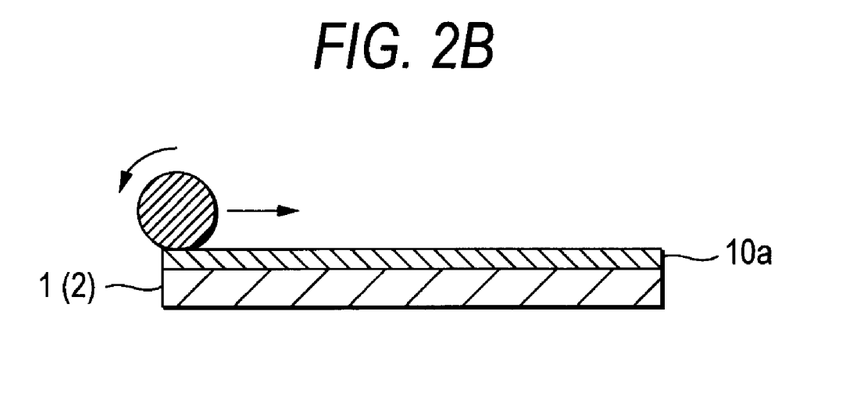
Figure 2C:
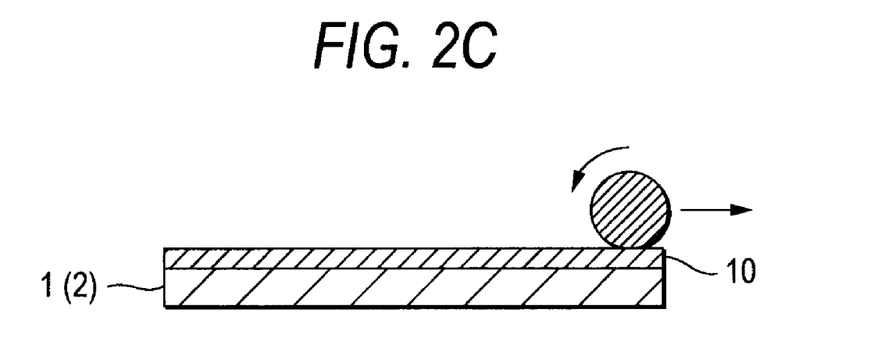

In the foregoing liquid crystal display element, materials of the liquid crystal orientation layer 10 are characterized. In the liquid crystal orientation layer 10 according to the present embodiment, an orientation function is imparted by a rubbing method. FIGS. 2A to 2C are each a process cross-sectional view for explaining a forming method of the liquid crystal orientation layer 10.

As illustrated in FIG. 2A, a liquid crystal orientation layer material is subjected to film formation on the TFT array substrate 1 having the thin film transistor 5 and the pixel electrode 6 and so on formed thereon or the counter substrate 2 having the common electrode 7 formed thereon (these substrates will be hereinafter simply referred to as "substrates 1 and 2") by, for example, a spin coating method and then subjected to a heat treatment or the like as the need arises, thereby forming a liquid crystal orientation layer 10a.

As a forming method of the liquid crystal orientation layer 10a, besides the spin coating method, a printing method, an inkjet method, a roll coater method, a slit coater method, a CVD (chemical vapor deposition) method, and so on are employable.

Next, as illustrated in FIG. 2B, the liquid crystal orientation layer 10a is subjected to a rubbing treatment. In the rubbing treatment, a rubbing roll 20 having a rubbing cloth (for example, felt and cotton) wound therearound is rotated on the substrate, and the substrates 1 and 2 placed on a table are moved in a reverse direction to the rotation direction of the rubbing roll 20. As illustrated in FIG. 2C, after rubbing, the liquid crystal orientation layer 10 having a function to orient the liquid crystal 3 is obtained.

In a side of the counter substrate 2, prior to forming the liquid crystal orientation layer 10, a photosensitive resin layer is subjected to film formation; the spacer 4 is formed by patterning by a photolithography process; and the liquid crystal orientation layer 10 is then formed in the foregoing manner.

Next, materials of the foregoing liquid crystal orientation layer 10 will be hereunder described.

The liquid crystal orientation layer according to the present embodiment contains at least one polymer selected from polyamic acids and polyimides and at least one epoxy compound having a chemical structure represented by the foregoing formula (1) or (2), the X moieties in the formulae containing an alicyclic epoxy group or a glycidyl group represented by the foregoing formula (a) or (b). Incidentally, the liquid crystal orientation layer according to the present embodiment may contain other additives.

Alternatively, the liquid crystal orientation layer according to the present embodiment contains at least one polymer selected from polyamic acids and polyimides and an epoxy compound represented by the foregoing formula (3) or (4) or a polymer thereof. Incidentally, the liquid crystal orientation layer according to the present embodiment may contain other additives.

In the present embodiment, by adding the foregoing epoxy compound to the polymer, the epoxy compound acts as a crosslinking agent. For that reason, even in the case where the average molecular weight does not exceed 100,000 as in a polymer with a reduced concentration of a phenyl group, it is possible to compensate the strength of the polymer by the epoxy compound. Furthermore, the present embodiment is characterized by using an aromatic ring-free epoxy compound. Constitutional materials of the liquid crystal orientation layer will be hereunder described in detail.

(Polyimide or Polyamic Acid Material)

A polyamic acid is formed by making an acid di-anhydride and a diamine react with each other in an organic-soluble. This polyamic acid is subjected to dehydration ring closure by a heat treatment or by the addition of acetic anhydride, thereby forming a polyimide. The liquid crystal orientation layer according to the present embodiment contains either one of the polyamic acid or the polyimide or both of them.

In the present embodiment, from the viewpoint of improving the light fastness of the liquid crystal orientation layer, it is preferred to use a polyimide or polyamic acid material with a low concentration of a phenyl group among polyimides or polyamic acids.

Organic-soluble polyimide materials are commercially available as, for example, OPTOMER AL1207R14 (manufactured by JSR Corporation). The OPTOMER AL1207R14 is formed from 2,3,5-tricarboxycyclopentyl acetic dianhydride ($C_{10}H_8O_6$), 4,4-diaminodiphenylmethane ($C_{13}H_{14}N_2$) and p-phenylenediamine ($C_6H_8N_2$) as major monomer components and an aliphatic diamine and a pre-tilt angle-revealing diamine.

Organic-soluble polyamic acid materials are commercially available as, for example, SUNEVER SE7492 (manufactured by Nissan Chemical Industries, Ltd.). The SUNEVER SE7492 mainly contains a reaction product of cyclobutane-tetracarboxylic acid dianhydride, 4,4'-diaminodiphenylmethane and a diamine for tilting.

Organic-soluble wholly alicyclic polyimide materials are commercially available as, for example, PI-100 (manufactured by Maruzen Petrochemical Co., Ltd.). The PI-100 is expressed by the foregoing formula (A) and is a wholly alicyclic polymer with good light fastness. Furthermore, since the PI-100 is supplied as a solid, it is dissolved in an organic-soluble such as N-methyl-2-pyrrolidone and used.

(Epoxy Compound)

The liquid crystal orientation layer according to the present embodiment is characterized by containing at least one kind of an epoxy compound represented by the foregoing formula (1) or (2) or an epoxy compound represented by the foregoing formula (3) or (4) or a polymer thereof.

The epoxy compound represented by the foregoing formula (1) or (2) is largely separated into an aliphatic polyhydric epoxy compound or an alicyclic polyhydric epoxy compound depending upon whether each of X1 to X3 is an alicyclic epoxy group or a glycidyl group.

Examples of the aliphatic polyhydric epoxy compound represented by the foregoing formula (1) or (2) include ethylene glycol diglycidyl ether, glycerin polyglycidyl ether, polyethylene glycol polyglycidyl ether, diglycerine polyglycidyl ether, propylene glycol diglycidyl ether, tripropylene glycol diglycidyl ether, polypropylene glycol diglycidyl ether, neopentyl glycol diglycidyl ether, 1,6-hexanediol diglycidyl ether, glycerin diglycidyl ether, 2,2-dibromoneopentyl glycol diglycidyl ether, 1,3,5,6-tetraglycdyl-2,4-hexanediol, and trimethylolpropane polyglycidyl ether.

The foregoing compounds are commercially available from Kyoeisha Chemical Co., Ltd. as EPOLIGHT Series, for example, EPOLIGHT 40E, EPOLIGHT 200E, EPOLIGHT 400E, EPOLIGHT 70P, EPOLIGHT 200P, EPOLIGHT 200P, EPOLIGHT 400P, EPOLIGHT 1500NP, EPOLIGHT 1600, EPOLIGHT 80MF, and EPOLIGHT FR-1500. Besides, the foregoing compounds are commercially available from Sakamoto Yakuhin Kogyo Co., Ltd. as special epoxy resins in the name of SR Series. Furthermore, the foregoing compounds are commercially available from Nagase ChemteX Corporation as DENACOL EX-L Series, for example, EX-212L, EX-214L, EX-216L, EX-321L, and EX-850L.

The ethylene glycol diglycidyl ether is represented by the following formula (5) and is commercially available from Wako Pure Chemical Industries, Ltd.

(5)

Examples of the alicyclic polyhydric epoxy compound represented by the forgoing formula (1) or (2) include ε-caprolactone-modified 3,4-epoxycyclohexylmethyl-3',4'-epoxycyclohexane carboxylate, 1,2:8,9-diepoxylimonene, epoxidized 3-cyclohexene-1,2-dicarboxylic acid bis(3-cyclohexenylmethyl)-modified ε-caprolactone, epoxidized butanetetracarboxylic acid tetrakis(3-cyclohexenylmethyl)-modified ε-caprolactone, an epoxidized polybutadiene, 1,2-epoxy-4-(2-oxiranyl)cyclohexane adduct of 2,2-bis(hydroxy-methyl)-1-butanol, an 1,2-epoxy-4-(2-oxiranyl) cyclohexane adduct of 2,2-bis(hydroxymethyl)-1-butanol, and 3,4-epoxy-cyclohexenylmethyl-3',4'-epoxycyclohexene carboxylate. These compounds are commercially available from Daicel Chemical Industries, Ltd. as CELLOXIDE Series, EPOLEAD Series, and so on. Of the foregoing compounds, 3,4-epoxycyclohexenylmethyl-3',4'-epoxycyclohexene carboxylate represented by the following formula (6) is commercially available as CELLOSIDE 2021P (manufactured by Daicel Chemical Industries, Ltd.). Furthermore, examples of the alicyclic polyhydric epoxy compound represented by the foregoing formula (2) include 2,4,6-tricyclohexylepoxide-1,3,5-trioxacyclohexane represented by the following chemical formula (7).

(6)

(7)

Furthermore, examples of the epoxy compound represented by the foregoing formula (4) include epoxy compounds represented by the following formula (8). The epoxy compounds represented by the following formula (8) are commercially available from Daicel Chemical Industries, Ltd.

(8)

(Blending Amount of Epoxy Compound)

In the liquid crystal orientation layer according to the present embodiment, it is preferable that a proportion of the epoxy compound to the foregoing polymer is 10% by weight or more and not more than 20% by weight. From the viewpoint of improving the layer strength, when this proportion is less than 10% by weight, the layer strength becomes insufficient. On the other hand, when it exceeds 20% by weight, the orienting function of the liquid crystal orientation layer becomes problematic.

(Other Additives)

In order to improve the adhesion to the substrate, it is preferable that a silane coupling agent is contained. Examples of the silane coupling agent include vinyl-triethoxysilane, N-(2-aminoethyl)-3-aminopropylmethyldimethoxysilane, N-(2-aminoethyl)-3-aminopropylmethyltrimethoxysilane, 3-aminopropyltriethoxysilane, 3-aminopropyltrimethoxysilane, 3-glycidoxypropylmethyldimethoxysilane, 2-(3,4-epoxycyclohexyl)ethyltrimethoxysilane, 3-methacryloxypropyltrimethoxysilane, N-(1,3-dimethylbutylidene)-3-(triethoxysilyl)-1-propaneamine, and N,N'-bis[3-(trimethoxy-silyl)propyl]ethylenediamine. The foregoing compounds are commercially available from Chisso Corporation as SILA-ACE Series. Incidentally, plural silane coupling agents are also commercially available from Dow Corning Tray Co., Ltd. It is preferable that the foregoing silane coupling agent is added in an amount ranging from 0.1 to 15% in terms of a weight ratio.

According to the liquid crystal orientation layer of the present embodiment, it is possible to improve the light fastness and layer strength.

Furthermore, by using the foregoing liquid crystal orientation layer, it is possible to realize a liquid crystal display element capable of designing to prolong the life.

Second Embodiment

An active matrix type liquid crystal display element according to the present embodiment has a configuration the same as in the liquid crystal display element according to the First Embodiment but is different in materials constituting the liquid crystal orientation layer.

Materials of the liquid crystal orientation layer according to the present embodiment will be hereunder described.

The liquid crystal orientation layer according to the embodiment of the present invention contains at least one polymer selected from polyamic acids and polyimides and at least one epoxy compound represented by the foregoing formula (I). Incidentally, the liquid crystal orientation layer according to the present embodiment may contain other additives.

In the epoxy compound represented by the foregoing formula (I), R13 to R16 each represents an epoxy-containing alkyl group, for example, a glycidyl group.

For example, as the foregoing epoxy compound, an epoxy compound having a chemical structure represented by any one of the foregoing formulae (II) to (IV) can be used.

In the present embodiment, by adding the foregoing epoxy compound to the polymer, the epoxy compound acts as a crosslinking agent. For that reason, even in the case where the average molecular weight does not exceed 100,000 as in a polymer with a reduced concentration of a phenyl group, it is possible to compensate the strength of the polymer by the epoxy compound. Furthermore, the present embodiment is characterized by using an aromatic ring-free epoxy compound.

(Content of Epoxy Compound)

In the liquid crystal orientation layer according to the present embodiment, it is preferable that a proportion of the epoxy compound to the foregoing polymer is 10% by weight or more and not more than 40% by weight. From the viewpoint of improving the layer strength, when this proportion is less than 10% by weight, the layer strength becomes insufficient. On the other hand, when it exceeds 40% by weight, the orienting function of the liquid crystal orientation layer may possibly become problematic.

With respect to the polyimide or polyamic acid materials and other additives, the same compounds as in the First Embodiment can be used in the same proportions.

According to the liquid crystal orientation layer of the present embodiment, it is possible to improve the light fastness and layer strength.

Furthermore, by using the foregoing liquid crystal orientation layer, it is possible to realize a liquid crystal display element capable of designing to prolong the life.

According to the liquid crystal orientation layer of the present embodiment, it is possible to realize a liquid crystal orientation layer having excellent light fastness, which is able to be formed by a simple rubbing method without largely changing orientation properties and manufacturing process regarding existing orientation layer materials, and a liquid crystal display element.

In addition, by using the foregoing epoxy compound, while the light fastness is improved with an increase of the addition amount, a change in the layer strength is small against the addition amount, and even when the proportion of the epoxy compound to the polymer exceeds 20% by weight, the epoxy compound can be used so that its useful range can be widened as compared with that in the First Embodiment.

EXAMPLES

First Example

The invention will be hereunder described in more detail with reference to the following Examples, but it should not be construed that the invention is limited to these Examples. Incidentally, evaluation items and evaluation methods of liquid crystal orientation layers formed in the following Examples and Comparative Examples are shown below.

Pencil Hardness

The pencil hardness was measured according to an evaluation method of JIS K5400. A glass substrate having a thickness of 1.2 mm was used as a substrate; an orienting agent which is an arbitrary polymer solution was coated by using a spinner and dried at a baking temperature of 200° C. for one hour to form a coating film having a dry thickness of about 0.1 μm; and this coating film was provided for the measurement.

In the evaluation, five or more panels were actually measured, and in tests which can be expressed by numerical values, an average in each test was calculated and defined as a value. The same is applicable in the following evaluations unless otherwise indicated specifically.

Orientation Properties of Liquid Crystal

A liquid crystal orienting agent was coated on each of the TFT array substrate 1 and the counter substrate 2, following by undergoing a rubbing treatment. The substrates 1 and 2 were faced at each other such that the rubbed orientation layer surfaces thereof were positioned inwardly and that the respective rubbing directions were orthogonal (90°) to each other, and a part of the outer periphery thereof was provided with a partition (liquid crystal injection opening) and fixed with an epoxy resin based adhesive.

After hardening the outer periphery, the liquid crystal 3 was injected into the glass cell, and the injection opening was fixed with an acrylic or urethane based ultraviolet ray-curable resin to form a liquid crystal cell. Thereafter, the liquid crystal cell was annealed at a temperature of [(NI point temperature of injected liquid crystal)+10° C.] and then set in a projector. By using two polarized plates and a projection light unit, a projected image plane was visually confirmed.

As the liquid crystal used in the present Examples, SY-5172RC as manufactured by Chisso Petrochemical Corporation was used unless otherwise indicated.

Light Fastness

A light fastness test method and a test device (made by Sony Corporation) which are proposed in JP-A-2001-4526 were employed.

As a lamp, a UHP lamp of 250 W as manufactured by Ushio Inc. was used. A liquid crystal display element prepared for every orientation layer material was irradiated with light by the subject evaluation device and tested for the light fastness.

With respect to the judgment of the light fastness, a time of the generation of bubbles within the liquid crystal display element due to the decomposition of the orientation layer or the like was employed and expressed as a numerical value on a basis of a time of the generation of bubbles of a polyimide based orientation layer OPTOMER AL1207R14 as manufactured by JSR Corporation.

Voltage Retention Rate

A liquid crystal display element was prepared in the method as described previously in the orientation properties of liquid crystal and provided for the measurement under the following condition.

An instrument and a condition as used for the measurement are as follows.

Instrument: VHR-1 Model, manufactured by Toyo Technica Inc.

Condition:

Applied voltage: 5V

Pulse width: 64 μsec

Cycle: 16.7 msec

Circumferential temperature: 75° C.

Rubbing Buff Scum

An orientation layer surface resulting from coating a liquid crystal orientation layer on the TFT array substrate 1 or the counter substrate 2 and subjecting to a rubbing treatment was photographed by a digital camera through an optical microscope with a magnification of 100 times under a condition of dark field.

Photographed pictures were subjected to image processing by using a software (Scion Image, manufactured by Scion Corporation), and the resulting numerical value was defined as a rubbing buff scum number per unit area.

The rubbing condition in the present Examples and Comparative Examples is as follows.

Rubbing buff material: Rayon having a thickness of 1.5 deniers and a fiber length of 1.3 mm Rubbing roll size: 50 mm Number of revolution of roll: 500 rpm Movement speed of substrate: 20 mm/sec Fiber indentation length: 0.35 mm Number of rubbing: 2 times After rubbing, cleaning was carried out using an IPA vapor.

With respect to the Examples and Comparative Examples, the kind of polymer material and the kind and amount of additive are shown in Table 1.

TABLE 1

|  | Polymer material | Epoxy compound | Mixing amount[1] |
|---|---|---|---|
| Example 1 | OPTOMER AL1207R14 | CELLOXIDE 2021P | 5% |
| Example 2 |  |  | 10% |
| Example 3 |  |  | 15% |
| Example 4 |  |  | 20% |
| Example 5 | SUNEVER SE7492 | CELLOXIDE 2021P | 5% |
| Example 6 |  |  | 10% |
| Example 7 |  |  | 15% |
| Example 8 |  |  | 20% |
| Example 9 | PI-100 | CELLOXIDE 2021P | 5% |
| Example 10 |  |  | 10% |
| Example 11 |  |  | 15% |
| Example 12 |  |  | 20% |
| Example 13 | OPTOMER AL1207R14 | Ethylene glycol diglycidyl ether | 5% |
| Example 14 |  |  | 10% |
| Example 15 |  |  | 15% |
| Example 16 |  |  | 20% |
| Example 17 | SUNEVER SE7492 | Ethylene glycol diglycidyl ether | 5% |
| Example 18 |  |  | 10% |
| Example 19 |  |  | 15% |
| Example 20 |  |  | 20% |
| Example 21 | PI-100 | Ethylene glycol diglycidyl ether | 5% |
| Example 22 |  |  | 10% |
| Example 23 |  |  | 15% |
| Example 24 |  |  | 20% |
| Comparative Example 1 | OPTOMER AL1207R14 | — | 0% |
| Comparative Example 2 | SUNEVER SE7492 | — | 0% |
| Comparative Example 3 | PI-100 | — | 0% |
| Comparative Example 4 | OPTOMER AL1207R14 | TETRAD-X | 10% |
| Comparative Example 5 | SUNEVER SE7492 |  | 10% |
| Comparative Example 6 | PI-100 |  | 10% |

Note
[1]Weight % based on the whole of solids of polymer material

In Examples 1 to 4, OPTOMER AL1207R14 as manufactured by JSR Corporation, which is a commercially available organic-soluble polyimide material, was used as the polymer material; and CELLOSIDE 2021P as manufactured by Daicel Chemical Industries, Ltd. (a chemical name: 3,4-epoxycyclohexenylmethyl-3',4'-epoxycyclohexene carboxylate), which is an alicyclic polyhydric epoxy compound, was used as the epoxy compound. In these Examples, the mixing amount of the epoxy compound to the polymer material was changed to 5%, 10%, 15% and 20%, respectively.

In Examples 5 to 8, SUNEVER SE7492 as manufactured by Nissan Chemical Industries, Ltd., which is a commercially available organic-soluble polyamic acid material, was used as the polymer material; and CELLOSIDE 2021P the same as in Examples 1 to 4 was used as the epoxy compound. In these Examples, the mixing amount of the epoxy compound to the polymer material was changed to 5%, 10%, 15% and 20%, respectively.

In Examples 9 to 12, PI-100 as manufactured by Maruzen Petrochemical Co., Ltd., which is a commercially available organic-soluble wholly alicyclic polyimide material, was used as the polymer material; and CELLOSIDE 2021P the same as in Examples 1 to 4 was used as the epoxy compound. Furthermore, since the PI-100 is supplied as a solid, its solution having a concentration of 2% in N-methyl-2-pyrrolidone was prepared as a base solution upon weighing. In these Examples, the mixing amount of the epoxy compound to the polymer material was changed to 5%, 10%, 15% and 20%, respectively.

In Examples 13 to 16, OPTOMER AL1207R14 as manufactured by JSR Corporation, which is a commercially available organic-soluble polyimide material, was used as the polymer material; and ethylene glycol diglycidyl ether as manufactured by Wako Pure Chemical Industries, Ltd., which is an alicyclic polyhydric epoxy compound, was used as the epoxy compound. In these Examples, the mixing amount of the epoxy compound to the polymer material was changed to 5%, 10%, 15% and 20%, respectively.

In Examples 17 to 20, SUNEVER SE7492 as manufactured by Nissan Chemical Industries, Ltd., which is a commercially available organic-soluble polyamic acid material, was used as the polymer material; and a material the same as in Examples 13 to 16 was used as the epoxy compound. In these Examples, the mixing amount of the epoxy compound to the polymer material was changed to 5%, 10%, 15% and 20%, respectively.

In Examples 21 to 24, PI-100 as manufactured by Maruzen Petrochemical Co., Ltd., which is a commercially available organic-soluble wholly alicyclic polyimide material, was used as the polymer material; and a material the same as in Examples 13 to 16 was used as the epoxy compound. Furthermore, since the PI-100 is supplied as a solid, its solution having a concentration of 2% in N-methyl-2-pyrrolidone was prepared as a base solution upon weighing. In these Examples, the mixing amount of the epoxy compound to the polymer material was changed to 5%, 10%, 15% and 20%, respectively.

In Comparative Example 1, OPTOMER AL1207R14 as manufactured by JSR Corporation, which is a commercially available organic-soluble polyimide material, was used as the polymer material; and the epoxy compound was not mixed.

In Comparative Example 2, SUNEVER SE7492 as manufactured by Nissan Chemical Industries, Ltd., which is a commercially available organic-soluble polyamic acid material, was used as the polymer material; and the epoxy compound was not mixed.

In Comparative Example 3, PI-100 as manufactured by Maruzen Petrochemical Co., Ltd., which is a commercially available organic-soluble wholly alicyclic polyimide material, was used as the polymer material; and the epoxy compound was not mixed.

In Comparative Examples 4 to 6, TETRAD-X as manufactured by Mitsubishi Gas Chemical Company, Inc. (a chemical name: N,N,N',N'-tetraglycidyl-m-xylenediamine), which is a polyhydric epoxy compound, was mixed in the polymer material as shown in Comparative Examples 1 to 3. The mixing amount was set up at 10%. The N,N,N',N'-tetraglycidyl-m-xylenediamine is represented by the following formula (9) and is described in the foregoing Patent Document 3. As expressed in the following formula (9), since an aromatic ring is present in the chemical structure, it is thought that these Comparative Examples are suitable as a comparative example of the present Examples.

(9)

The evaluation results of the liquid crystal orientation layers formed in the foregoing Examples 1 to 24 and Comparative Examples 1 to 6 are shown in Table 2.

TABLE 2

|  | Rubbing buff scum | Pencil hardness | Orientation properties of liquid crystal | Light fastness | Voltage retention rate |
|---|---|---|---|---|---|
| Example 1 | 18 | B | Good | 1.0 | 99.1 |
| Example 2 | 15 | B | Good | 1.1 | 99.0 |
| Example 3 | 6 | H | Good | 1.1 | 99.1 |
| Example 4 | 3 | 2H | Good | 1.1 | 99.0 |
| Example 5 | 2 | H | Good | 0.4 | 98.6 |
| Example 6 | 2 | H | Good | 0.4 | 98.6 |
| Example 7 | 2 | 2H | Good | 0.5 | 98.5 |
| Example 8 | 1 | 2H | Good | 0.4 | 98.5 |
| Example 9 | 8 | H | Good | 2.0 | 97.0 |
| Example 10 | 5 | H | Good | 2.0 | 97.3 |
| Example 11 | 2 | H | Good | 2.1 | 97.1 |
| Example 12 | 1 | 2H | Good | 2.1 | 97.3 |
| Example 13 | 15 | B | Good | 1.0 | 99.0 |
| Example 14 | 11 | HB | Good | 1.1 | 99.1 |
| Example 15 | 8 | H | Good | 1.0 | 99.0 |
| Example 16 | 5 | 2H | Good | 1.0 | 99.0 |
| Example 17 | 2 | H | Good | 0.4 | 99.0 |
| Example 18 | 1 | H | Good | 0.5 | 98.9 |
| Example 19 | 1 | H | Good | 0.5 | 98.9 |
| Example 20 | 1 | 2H | Good | 0.5 | 98.8 |
| Example 21 | 6 | H | Good | 2.0 | 97.0 |
| Example 22 | 5 | H | Good | 2.0 | 97.1 |
| Example 23 | 2 | H | Good | 2.1 | 97.1 |

TABLE 2-continued

|  | Rubbing buff scum | Pencil hardness | Orientation properties of liquid crystal | Light fastness | Voltage retention rate |
|---|---|---|---|---|---|
| Example 24 | 1 | 2H | Good | 2.0 | 97.2 |
| Comp. Ex. 1 | 17 | B | Good | 1.0 | 99.1 |
| Comp. Ex. 2 | 3 | H | Good | 0.4 | 98.7 |
| Comp. Ex. 3 | 11 | H | Good | 2.0 | 97.1 |
| Comp. Ex. 4 | 4 | H | Good | 0.5 | 99.0 |
| Comp. Ex. 5 | 1 | 2H | Good | 0.2 | 98.3 |
| Comp. Ex. 6 | 2 | 2H | Good | 0.8 | 97.1 |

It is preferable that the rubbing buff scum is not more than 10; that the pencil hardness is H or more; that the light fastness is 1 or more; and that the voltage retention rate is 90% or more. With respect to the light fastness, the light fastness of the liquid crystal orientation layer of Comparative Example 1 was defined as 1. The layer strength of the liquid crystal orientation layer is evaluated by the rubbing buff scum and the pencil hardness.

As shown in Table 2, in the liquid crystal orientation layers resulting from mixing the epoxy compound of each of the present Examples in the polymer material, it was confirmed that the layer strength can be improved without lowering the light fastness. Incidentally, from the viewpoint of improving the layer strength, it is preferable that the proportion of the epoxy compound is 10% by weight or more and not more than 20% by weight. This is because when the proportion of the epoxy compound is less than 10% by weight, the rubbing buff scum number is large and the pencil hardness is not sufficient; and on the other hand, when it exceeds 20% by weight, the orienting function of the liquid crystal orientation layer becomes problematic.

On the other hand, in the liquid crystal orientation layers of the Comparative Examples, it was confirmed that the light fastness is lowered as compared with the original polymer material. This is because in the Comparative Examples, the aromatic ring-containing epoxy compound is added.

Furthermore, from the viewpoint of improving the light fastness, it is preferable that an aromatic ring-free wholly aliphatic polymer is used as the polymer material (see Examples 9 to 12 and 21 to 24). In this way, an aromatic ring-free liquid crystal orientation layer is obtained so that a problem such as absorption of ultraviolet rays is not generated.

From the foregoing results, according to the liquid crystal orientation layer according to the present Examples, it is possible to manufacture a liquid crystal orientation layer with improved light fastness and layer strength simply and in a wide process margin. In particular, it is possible to manufacture an aromatic ring-free wholly aliphatic polyimide simply as the liquid crystal orientation layer.

Second Example

Evaluation items and evaluation methods of liquid crystal orientation layers formed in the following Examples and Comparative Examples are the same as in the First Example with respect to the pencil hardness, the orientation properties of liquid crystal, the light fastness, the voltage retention rate, and the rubbing buff scum. Furthermore, the "pre-tilt angle" is evaluated in the following manner.

Pre-Tilt Angle

A liquid crystal display element was prepared in the method as described previously in the item of the orientation properties of liquid crystal and provided for the measurement under the following condition.

An instrument and a condition as used for the measurement are as follows.

Instrument: PAS-301 Model, manufactured by Toyo Technica Inc.

Condition:

Circumferential temperature: 23° C.

With respect to the Examples and Comparative Examples, the kind of polymer material and the kind and amount of additive are shown in Table 3.

In Examples 30 to 34, SUNEVER SE7492 as manufactured by Nissan Chemical Industries, Ltd., which is a commercially available organic-soluble polyamic acid material, was used as the polymer material; and N,N,N',N'-tetraglycidyl-4,4'-methylenebiscyclohexyldiamine the same as in Examples 25 to 29 was used as the epoxy compound. In these Examples, the mixing amount of the epoxy compound to the polymer material was changed to 10%, 20%, 30%, 40% and 50%, respectively.

TABLE 3

| | | Epoxy compound | |
| --- | --- | --- | --- |
| | Polymer material | | Mixing amount[1] |
| Example 25 | OPTOMER AL1207R14 | N,N,N',N'-Tetraglycidyl-4,4'-methylene- | 10% |
| Example 26 | | biscyclohexyldiamine | 20% |
| Example 27 | | | 30% |
| Example 28 | | | 40% |
| Example 29 | | | 50% |
| Example 30 | SUNEVER SE7492 | N,N,N',N'-Tetraglycidyl-4,4'-methylene- | 10% |
| Example 31 | | biscyclohexyldiamine | 20% |
| Example 32 | | | 30% |
| Example 33 | | | 40% |
| Example 34 | | | 50% |
| Example 35 | PI-100 | N,N,N',N'-Tetraglycidyl-4,4'-methylene- | 10% |
| Example 36 | | biscyclohexyldiamine | 20% |
| Example 37 | | | 30% |
| Example 38 | | | 40% |
| Example 39 | | | 50% |
| Example 40 | OPTOMER AL1207R14 | N,N,N',N'-Tetraglycidyl-m-cyclohexyldiamine | 10% |
| Example 41 | | | 20% |
| Example 42 | | | 30% |
| Example 43 | | | 40% |
| Example 44 | | | 50% |
| Example 45 | SUNEVER SE7492 | N,N,N',N'-Tetraglycidyl-m-cyclohexyldiamine | 10% |
| Example 46 | | | 20% |
| Example 47 | | | 30% |
| Example 48 | | | 40% |
| Example 49 | | | 50% |
| Example 50 | PI-100 | N,N,N',N'-Tetraglycidyl-m-cyclohexyldiamine | 10% |
| Example 51 | | | 20% |
| Example 52 | | | 30% |
| Example 53 | | | 40% |
| Example 54 | | | 50% |
| Comp. Ex. 7 | OPTOMER AL1207R14 | — | 0% |
| Comp. Ex. 8 | SUNEVER SE7492 | — | 0% |
| Comp. Ex. 9 | PI-100 | — | 0% |
| Comp. Ex. 10 | OPTOMER AL1207R14 | TETRAD-X | 10% |
| Comp. Ex. 11 | | | 20% |
| Comp. Ex. 12 | | | 30% |
| Comp. Ex. 13 | | | 40% |
| Comp. Ex. 14 | | | 50% |
| Comp. Ex. 15 | SUNEVER SE7492 | | 10% |
| Comp. Ex. 16 | | | 20% |
| Comp. Ex. 17 | | | 30% |
| Comp. Ex. 18 | | | 40% |
| Comp. Ex. 19 | | | 50% |
| Comp. Ex. 20 | PI-100 | | 10% |
| Comp. Ex. 21 | | | 20% |
| Comp. Ex. 22 | | | 30% |
| Comp. Ex. 23 | | | 40% |
| Comp. Ex. 24 | | | 50% |

Note
[1] Weight % based on the whole of solids of polymer material

In Examples 25 to 29, OPTOMER AL1207R14 as manufactured by JSR Corporation, which is a commercially available organic-soluble polyimide material, was used as the polymer material; and N,N,N',N'-tetraglycidyl-4,4'-methylenebiscyclohexyldiamine which is an alicyclic polyhydric epoxy compound was used as the epoxy compound. In these Examples, the mixing amount of the epoxy compound to the polymer material was changed to 10%, 20%, 30%, 40% and 50%, respectively.

In Examples 35 to 39, PI-100 as manufactured by Maruzen Petrochemical Co., Ltd., which is a commercially available organic-soluble wholly alicyclic polyimide material, was used as the polymer material; and N,N,N',N'-tetraglycidyl-4,4'-methylenebiscyclohexyldiamine the same as in Examples 25 to 29 was used as the epoxy compound. Furthermore, since the PI-100 is supplied as a solid, its solution having a concentration of 2% in N-methyl-2-pyrrolidone was prepared as a base solution upon weighing. In these Examples, the mixing amount of the epoxy compound to the polymer material was changed to 10%, 20%, 30%, 40% and 50%, respectively.

In Examples 40 to 44, OPTOMER AL1207R14 as manufactured by JSR Corporation, which is a commercially available organic-soluble polyimide material, was used as the polymer material; and N,N,N',N'-tetraglycidyl-m-cyclohexyldiamine which is an aliphatic polyhydric epoxy compound was used as the epoxy compound. In these Examples, the mixing amount of the epoxy compound to the polymer material was changed to 10%, 20%, 30%, 40% and 50%, respectively.

In Examples 45 to 49, SUNEVER SE7492 as manufactured by Nissan Chemical Industries, Ltd., which is a commercially available organic-soluble polyamic acid material, was used as the polymer material; and N,N,N',N'-tetraglycidyl-m-cyclohexyldiamine the same as in Examples 40 to 44 was used as the epoxy compound. In these Examples, the mixing amount of the epoxy compound to the polymer material was changed to 10%, 20%, 30%, 40% and 50%, respectively.

In Examples 50 to 54, PI-100 as manufactured by Maruzen Petrochemical Co., Ltd., which is a commercially available organic-soluble wholly alicyclic polyimide material, was used as the polymer material; and N,N,N',N'-tetraglycidyl-m-cyclohexyldiamine the same as in Examples 40 to 44 was used as the epoxy compound. Furthermore, since the PI-100 is supplied as a solid, its solution having a concentration of 2% in N-methyl-2-pyrrolidone was prepared as a base solution upon weighing. In these Examples, the mixing amount of the epoxy compound to the polymer material was changed to 10%, 20%, 30%, 40% and 50%, respectively.

In Comparative Example 7, OPTOMER AL1207R14 as manufactured by JSR Corporation, which is a commercially available organic-soluble polyimide material, was used as the polymer material; and the epoxy compound was not mixed.

In Comparative Example 8, SUNEVER SE7492 as manufactured by Nissan Chemical Industries, Ltd., which is a commercially available organic-soluble polyamic acid material, was used as the polymer material; and the epoxy compound was not mixed.

In Comparative Example 9, PI-100 as manufactured by Maruzen Petrochemical Co., Ltd., which is a commercially available organic-soluble wholly alicyclic polyimide material, was used as the polymer material; and the epoxy compound was not mixed.

In Comparative Examples 10 to 14, OPTOMER AL1207R14 as manufactured by JSR Corporation, which is a commercially available organic-soluble polyimide material, was used as the polymer material; and TETRAD-X as manufactured by Mitsubishi Gas Chemical Company, Inc. as represented by the foregoing formula (9) (a chemical name: N,N,N',N'-tetraglycidyl-m-xylenediamine) was used as the polyhydric epoxy compound. In these Comparative Examples, the mixing amount of the epoxy compound to the polymer material was changed to 10%, 20%, 30%, 40% and 50%, respectively.

In Comparative Examples 15 to 19, SUNEVER SE7492 as manufactured by Nissan Chemical Industries, Ltd., which is a commercially available organic-soluble polyamic acid material, was used as the polymer material; and TETRAD-X was used as the polyhydric epoxy compound. In these Comparative Examples, the mixing amount of the epoxy compound to the polymer material was changed to 10%, 20%, 30%, 40% and 50%, respectively.

In Comparative Examples 20 to 24, PI-100 as manufactured by Maruzen Petrochemical Co., Ltd., which is a commercially available organic-soluble wholly alicyclic polyimide material, was used as the polymer material; and TETRAD-X was used as the polyhydric epoxy compound. In these Comparative Examples, the mixing amount of the epoxy compound to the polymer material was changed to 10%, 20%, 30%, 40% and 50%, respectively.

The evaluation results of the liquid crystal orientation layers formed in the foregoing Examples 25 to 54 and Comparative Examples 7 to 24 are shown in Table 4.

TABLE 4

|  | Rubbing buff scum | Pencil hardness | Orientation properties of liquid crystal | Light fastness | Voltage retention rate | Pre-tilt angle |
| --- | --- | --- | --- | --- | --- | --- |
| Example 25 | 17 | B | Good | 1.0 | 99.2 | 5.9 |
| Example 26 | 19 | B | Good | 1.1 | 99.2 | 6.0 |
| Example 27 | 9 | HB | Good | 1.3 | 99.1 | 6.1 |
| Example 28 | 8 | HB | Good | 1.4 | 99.1 | 6.0 |
| Example 29 | 8 | H | Good | 1.4 | 99.1 | 6.0 |
| Example 30 | 2 | H | Good | 0.4 | 98.5 | 3.0 |
| Example 31 | 2 | 2H | Good | 0.5 | 98.4 | 3.1 |
| Example 32 | 1 | 2H | Good | 0.7 | 98.5 | 3.2 |
| Example 33 | 3 | 2H | Good | 0.7 | 98.5 | 3.1 |
| Example 34 | 2 | 2H | Good | 0.8 | 98.3 | 3.2 |
| Example 35 | 14 | H | Good | 2.1 | 97.1 | 0.7 |
| Example 36 | 11 | H | Good | 2.1 | 97.3 | 1.0 |
| Example 37 | 9 | H | Good | 2.8 | 97.1 | 1.2 |
| Example 38 | 7 | H | Good | 2.8 | 96.9 | 1.2 |
| Example 39 | 5 | H | Good | 2.9 | 97.2 | 1.2 |
| Example 40 | 18 | B | Good | 1.0 | 99.1 | 5.8 |
| Example 41 | 11 | B | Good | 1.0 | 99.3 | 6.2 |
| Example 42 | 8 | HB | Good | 1.3 | 99.2 | 6.0 |
| Example 43 | 7 | HB | Good | 1.3 | 99.3 | 6.2 |
| Example 44 | 7 | H | Good | 1.4 | 99.1 | 5.8 |
| Example 45 | 3 | H | Good | 0.4 | 98.5 | 3.2 |
| Example 46 | 2 | 2H | Good | 0.4 | 98.5 | 3.0 |
| Example 47 | 1 | 2H | Good | 0.6 | 98.6 | 3.0 |
| Example 48 | 2 | 2H | Good | 0.6 | 98.6 | 3.2 |
| Example 49 | 3 | 2H | Good | 0.7 | 98.5 | 3.1 |
| Example 50 | 17 | H | Good | 2.0 | 97.2 | 0.7 |
| Example 51 | 16 | H | Good | 2.1 | 97.4 | 1.1 |
| Example 52 | 5 | H | Good | 2.7 | 97.2 | 1.1 |
| Example 53 | 8 | H | Good | 2.7 | 97.0 | 1.0 |

TABLE 4-continued

| | Rubbing buff scum | Pencil hardness | Orientation properties of liquid crystal | Light fastness | Voltage retention rate | Pre-tilt angle |
|---|---|---|---|---|---|---|
| Example 54 | 4 | H | Good | 2.8 | 96.9 | 1.1 |
| Comp. Ex. 7 | 17 | B | Good | 1.0 | 99.1 | 6.1 |
| Comp. Ex. 8 | 3 | H | Good | 0.4 | 98.7 | 3.0 |
| Comp. Ex. 9 | 11 | H | Good | 2.0 | 97.1 | 0.5 |
| Comp. Ex. 10 | 4 | H | Good | 0.5 | 99.0 | 7.2 |
| Comp. Ex. 11 | 2 | 2H | Poor | — | — | — |
| Comp. Ex. 12 | 2 | 3H | Poor | — | — | — |
| Comp. Ex. 13 | 1 | 3H | Poor | — | — | — |
| Comp. Ex. 14 | 2 | 3H | Poor | — | — | — |
| Comp. Ex. 15 | 1 | 2H | Good | 0.2 | 98.3 | 3.2 |
| Comp. Ex. 16 | 2 | 3H | Poor | — | — | — |
| Comp. Ex. 17 | 3 | 4H | Poor | — | — | — |
| Comp. Ex. 18 | 1 | 4H | Poor | — | — | — |
| Comp. Ex. 19 | 2 | 4H | Poor | — | — | — |
| Comp. Ex. 20 | 2 | 2H | Good | 0.8 | 97.1 | 1.0 |
| Comp. Ex. 21 | 2 | 3H | Poor | — | — | — |
| Comp. Ex. 22 | 3 | 4H | Poor | — | — | — |
| Comp. Ex. 23 | 1 | 4H | Poor | — | — | — |
| Comp. Ex. 24 | 2 | 4H | Poor | — | — | — |

It is preferable that the rubbing buff scum is not more than 10; that the pencil hardness is H or more; that the light fastness is 1 or more; and that the voltage retention rate is 90% or more. With respect to the light fastness, the light fastness of the liquid crystal orientation layer of Comparative Example 1 was defined as 1. The layer strength of the liquid crystal orientation layer is evaluated by the rubbing buff scum and the pencil hardness.

As shown in Table 4, by using the foregoing epoxy compound, while the light fastness is improved with an increase of the addition amount, a change in the layer strength is small against the addition amount, and even when the proportion of the epoxy compound to the polymer exceeds 20% by weight, the epoxy compound can be used so that its useful range can be widened as compared with that in the First Embodiment.

It is preferable that the proportion of the epoxy compound to the polymer is 10% by weight or more and not more than 40% by weight. This is because when the proportion of the epoxy compound is less than 10% by weight, the rubbing buff scum number is large and the pencil hardness is not sufficient. On the other hand, when it exceeds 40% by weight, the orienting function of the liquid crystal orientation layer may possibly become problematic.

On the other hand, in the liquid crystal orientation layers of the Comparative Examples, it was confirmed that the light fastness is lowered as compared with the original polymer material. This is because in the Comparative Examples, the aromatic ring-containing epoxy compound is added.

Furthermore, from the viewpoint of improving the light fastness, it is preferable that an aromatic ring-free wholly aliphatic polymer is used as the polymer material (see Examples 35 to 39 and 50 to 54). In this way, an aromatic ring-free liquid crystal orientation layer is obtained so that a problem such as absorption of ultraviolet rays is not generated.

From the foregoing results, according to the liquid crystal orientation layer according to the present Examples, it is possible to manufacture a liquid crystal orientation layer with improved light fastness and layer strength simply and in a wide process margin. In particular, it is possible to manufacture an aromatic ring-free wholly aliphatic polyimide simply as the liquid crystal orientation layer.

It should not be construed that the invention is limited to the foregoing embodiments.

The liquid crystal display element provided with the liquid crystal orientation layer according to the present embodiments can be applied to various liquid crystal display elements.

As a liquid crystal display device, the liquid crystal display element provided with the liquid crystal orientation layer according to the present embodiments can be applied to not only a transmission type but also a reflection type.

Besides, various changes and modifications can be made within the range where the gist of the invention is not deviated.

The liquid crystal orientation layer of the embodiment of the invention can be applied to a liquid crystal orientation layer which configures a liquid crystal display element such as a liquid crystal projector using a light source capable of emitting light beams with excellent long-term reliability and high intensity.

The liquid crystal orientation element of the embodiment of the invention can be applied to a display element such as a liquid crystal projector using a light source capable of emitting light beams with excellent long-term reliability and high intensity.

It should be understood by those skilled in the art that various modifications, combinations, sub-combinations and alternations may occur depending on design requirements and other factors insofar as they are within the scope of the appended claims or the equivalents thereof.

What is claimed is:

1. A liquid crystal orientation layer comprising:
   at least one polymer selected from polyamic acids and polyimides; and
   at least one epoxy compound having a chemical structure represented by the formula (1) or (2):

(1)

(2)

wherein,
   A represents a divalent aliphatic group,
   B represents a triavalent aliphatic group, each of X1, X2 and X3 is an alicyclic epoxy group or a glycidyl group represented by the following formula (a) or (b):

(a)

wherein each of R1 to R10, which may be the same or different, represents a hydrogen atom, a halogen atom, a hydrocarbon group having from 1 to 5 carbon atoms, which may contain an oxygen atom or a halogen atom, or an optionally substituted alkoxy group having from 1 to 5 carbon atoms, and (b)

wherein each of R1 to R12, which may be the same or different, represents a hydrogen atom, a halogen atom, a hydrocarbon group having from 1 to 5 carbon atoms, which may contain an oxygen atom or a halogen atom, or an optionally substituted alkoxy group having from 1 to 5 carbon atoms.

2. The liquid crystal orientation layer according to claim 1, wherein the polymer is a wholly aliphatic polymer.

3. The liquid crystal orientation layer according to claim 2, wherein the polymer is made of a compound represented by the following formula (A):

(A)

4. The liquid crystal orientation layer according to claim 1, wherein a proportion of the epoxy compound to the polymer is 10% by weight or more and not more than 20% by weight.

5. A liquid crystal orientation layer comprising:
at least one polymer selected from polyamic acids and polyimides; and
an epoxy compound represented by the following formula (3) or (4) or a polymer thereof:

(3)

wherein each of R1 to R12, which may be the same or different, represents a hydrogen atom, a halogen atom, a hydrocarbon group having from 1 to 5 carbon atoms, which may contain an oxygen atom or a halogen atom, or an optionally substituted alkoxy group having from 1 to 5 carbon atoms, and (4)

wherein each of R1 to R10, which may be the same or different, represents a hydrogen atom, a halogen atom, a hydrocarbon group having from 1 to 5 carbon atoms, which may contain an oxygen atom or a halogen atom, or an optionally substituted alkoxy group having from 1 to 5 carbon atoms.

6. The liquid crystal orientation layer according to claim 5, wherein the polymer is a wholly aliphatic polymer.

7. The liquid crystal orientation layer according to claim 6, wherein the polymer is made of a compound represented by the following formula (A):

(A)

8. The liquid crystal orientation layer according to claim 5, wherein a proportion of the epoxy compound to the polymer is 10% by weight or more and not more than 20% by weight.

9. A liquid crystal orientation layer comprising:
at least one polymer selected from polyamic acids and polyimides; and
at least one epoxy compound represented by the following formula (I):

(I)

where Z represents a cyclic aliphatic group and R13 to R16 each represents an epoxy-containing alkyl group.

10. The liquid crystal orientation layer according to claim 9, wherein the epoxy compound has a chemical structure represented by any one of the following formulae (II) to (IV):

(II)

-continued (III)

(IV)

11. The liquid crystal orientation layer according to claim 9, wherein the polymer is a wholly aliphatic polymer.

12. The liquid crystal orientation layer according to claim 11, wherein the polymer is made of a compound represented by the following formula (A):

(A)

13. The liquid crystal orientation layer according to claim 9, wherein a proportion of the epoxy compound to the polymer is 10% by weight or more and not more than 40% by weight.

14. A liquid crystal display element comprising:

two substrates facing each other;

a liquid crystal filled between the two substrates;

liquid crystal orientation layer between either one of the substrates and the liquid crystal, wherein, the liquid crystal orientation layer contains (1) at least one polymer selected from polyamic acids and polyimides; and (2) at least one epoxy compound having a chemical structure represented by the following formula (1) or (2), (1)
(2)

where A represents a divalent aliphatic group, where B represents a trivalent aliphatic group, where each of X1 to X3 represents an alicyclic epoxy group or a glycidyl group represented by the formula (a) or (b)

(a)

wherein each of R1 to R10, which may be the same or different, represents a hydrogen atom, a halogen atom, a hydrocarbon group having from 1 to 5 carbon atoms, which may contain an oxygen atom or a halogen atom, or an optionally substituted alkoxy group having from 1 to 5 carbon atoms, and (b)

wherein each of R1 to R12, which may be the same or different represents a hydrogen atom, a halogen atom, a hydrocarbon group having from 1 to 5 carbon atoms, which may contain an oxygen atom or a halogen atom, or an optionally substituted alkoxy group having from 1 to 5 carbon atoms.

15. A liquid crystal display element comprising:

two substrates facing each other;

a liquid crystal in-between two substrates and a liquid crystal orientation layer between either one of the substrates and the liquid crystal, wherein, the liquid crystal orientation layer contains (1) at least one polymer selected from polyamic acids and polyimides; and (2) an epoxy compound represented by the following formula (3) or (4) or a polymer thereof:

(3)

wherein R1 to R12, which may be the same or different, each represents a hydrogen atom, a halogen atom, a hydrocarbon group having from 1 to 5 carbon atoms, which may contain an oxygen atom or a halogen atom, or an optionally substituted alkoxy group having from 1 to 5 carbon atoms, and (4)

wherein R1 to R10, which may be the same or different, each represents a hydrogen atom, a halogen atom, a hydrocarbon group having from 1 to 5 carbon atoms, which may contain an oxygen atom or a halogen atom, or an optionally substituted alkoxy group having from 1 to 5 carbon atoms.

16. A liquid crystal display element comprising:

two substrates facing each other;

a liquid crystal filled between the two substrates; and a liquid crystal orientation layer between either one of the substrates and the liquid crystal, wherein, the liquid crystal orientation layer contains (1) at least one polymer selected from polyamic acids and polyimides and (2) at least one epoxy compound represented by the following formula (I):

(I)

wherein Z represents a cyclic aliphatic group and R13 to R16 each represents an epoxy-containing alkyl group.

17. The liquid crystal display element according to claim 16, wherein the epoxy compound has a chemical structure represented by any one of the following formulae (II) to (IV):

(II)

(III)
(IV)

18. The liquid crystal display element according to claim 16, wherein a reflection layer is formed on either one of the two substrates.

* * * * *